US008943085B2

(12) United States Patent
Ruehle

(10) Patent No.: US 8,943,085 B2
(45) Date of Patent: Jan. 27, 2015

(54) START POINTER TRACKING IN NFAS

(71) Applicant: LSI Corporation, Milpitas, CA (US)

(72) Inventor: Michael Ruehle, Albuquerque, NM (US)

( * ) Notice: Subject to any disclaimer, the term of this patent is extended or adjusted under 35 U.S.C. 154(b) by 194 days.

(21) Appl. No.: 13/646,342

(22) Filed: Oct. 5, 2012

(65) Prior Publication Data
US 2014/0101185 A1    Apr. 10, 2014

(51) Int. Cl.
*G06F 17/30* (2006.01)
(52) U.S. Cl.
CPC .... *G06F 17/30861* (2013.01); *G06F 17/30985* (2013.01)
USPC .......................................................... 707/758
(58) Field of Classification Search
CPC .................... G06F 17/30985; G06F 2207/025; G06F 17/272; G06F 17/5027; G06F 9/46
USPC .......................................................... 707/758
See application file for complete search history.

(56) References Cited

U.S. PATENT DOCUMENTS

| 7,451,267 | B1 * | 11/2008 | Venkatachary et al. | ....... 711/108 |
| 7,656,716 | B1 * | 2/2010 | Srinivasan et al. | ........ 365/189.02 |
| 7,710,988 | B1 * | 5/2010 | Tripathi et al. | ................ 370/411 |
| 7,899,904 | B2 * | 3/2011 | Ruehle | ........................... 709/224 |
| 7,996,424 | B2 * | 8/2011 | Norton et al. | ................. 707/776 |
| 8,051,085 | B1 * | 11/2011 | Srinivasan et al. | ............. 707/737 |
| 8,077,061 | B2 * | 12/2011 | Cameron | ......................... 341/50 |
| 8,190,738 | B2 * | 5/2012 | Ruehle | ........................... 709/224 |
| 8,275,818 | B2 * | 9/2012 | Law et al. | ...................... 708/212 |
| 8,331,404 | B2 * | 12/2012 | Law et al. | ...................... 370/497 |
| 8,334,404 | B2 * | 12/2012 | Lucht et al. | .................... 562/816 |
| 8,386,411 | B2 * | 2/2013 | Atasu et al. | ...................... 706/48 |
| 8,386,530 | B2 * | 2/2013 | McMillen | ...................... 707/802 |
| 8,688,608 | B2 * | 4/2014 | Atasu et al. | ...................... 706/45 |
| 2011/0125695 | A1 * | 5/2011 | Ruehle | ............................ 706/46 |

* cited by examiner

*Primary Examiner* — Debbie Le
(74) *Attorney, Agent, or Firm* — Regan L. Trumper; Cochran Freund & Young LLC

(57) ABSTRACT

In a hardware engine, finding rule matches within an input stream by executing a Nondeterministic Finite Automaton (NFA) with active states tracked in parallel cells, a Start Pointer (SP) is captured by the cell beginning a match and passed from cell to cell until the match completes, when it is reported by the cell ending the match. For multiple overlapping matches, different cells may hold different SPs, and a cell representing multiple NFA states may hold multiple SPs. Methods are given to select one SP when multiple SPs collide in the same state.

15 Claims, 8 Drawing Sheets

Sample Input Stream
dcdcabdcbdcdecededbcebdccccdddecbddacdbe
                                        ╲
                                         220

```
CP= 0   states=0         char=d
CP= 1   states=0         char=c
CP= 2   states=0,1,3     char=d
CP= 3   states=0,1,3,4   char=c
CP= 4   states=0,1,3,4   char=a
CP= 5   states=0,1       char=b
CP= 6   states=0,1,2     char=d    Token (ID=1,SP=1,EP=6) "cdcabd"
CP= 7   states=0,1,2     char=e
CP= 8   states=0         char=b
CP= 9   states=0         char=d
CP=10   states=0         char=c
CP=11   states=0,1,3     char=d
CP=12   states=0,1,3,4   char=e
CP=13   states=0,3,4     char=c
CP=14   states=0,1,3,4   char=e
CP=15   states=0,3,4     char=d
CP=16   states=0,3,4     char=e
CP=17   states=0,3,4     char=d
CP=18   states=0,3,4     char=b    Token (2,10,18) "cdecededb"
CP=19   states=0,3,4     char=c
CP=20   states=0,1,3,4   char=e
CP=21   states=0,3,4     char=b    Token (2,10,21) "cdecededbceb"
CP=22   states=0,3,4     char=d
CP=23   states=0,3,4     char=c
CP=24   states=0,1,3,4   char=c
CP=25   states=0,1,3,4   char=c
CP=26   states=0,1,3,4   char=c
CP=27   states=0,1,3,4   char=d
CP=28   states=0,1,3,4   char=d
CP=29   states=0,1,3,4   char=d
CP=30   states=0,1,3,4   char=e
CP=31   states=0,3,4     char=c
CP=32   states=0,1,3,4   char=b    Token (2,10,32) "cdec...decb"
CP=33   states=0,1,2,3,4 char=d    Token (1,31,33) "cbd"
CP=34   states=0,1,2,3,4 char=d    Token (1,31,34) "cbdd"
CP=35   states=0,1,2,3,4 char=a
CP=36   states=0,1,2     char=c
CP=37   states=0,1,2,3   char=d    Token (1,31,37) "cbddacd"
CP=38   states=0,1,2,3,4 char=b    Token (2,36,38) "cdb"
CP=39   states=0,1,2,3,4 char=e
```

START POINTER TRACKING IN NFAS

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic. As information is transported across a network, there are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information. With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

SUMMARY OF THE INVENTION

An embodiment of the invention may therefore comprise a method of tracking a start pointer in active parallel cells in an NFA scanning system having a cell array, the method comprising establishing a start position value in an active start state cell where a match begins, upon a state transition from an active cell to a destination cell, transmitting the start position value from the active cell to the destination cell and activating the destination cell, and reporting the start position value by an active cell completing the match.

An embodiment of the invention may therefore further comprise a method for allocating a start position reference for a start state in an array of cells, comprising reading at least one start position references from a Free Queue and storing the read start position references in a circulating loop to represent first symbol positions, presenting one of the read start position references to all cells as each symbol of an input stream is consumed, if any start cell begins matching, storing the presented start position reference in that cell, signaling an SP Manager that the cell that began matching utilized the presented start position reference, writing, via the SP Manager, the presented start position reference into a Used Queue, and writing a corresponding symbol position into an SP Table at the address corresponding to the presented start position reference.

An embodiment of the invention may therefore further comprise system for tracking a start pointer in active parallel cells in an NFA scanning system, said system comprising an SP manager, a loader, a harvester and a reaper, a Free Queue, a Used Queue, and a plurality of NFA cells, wherein start point references (SPRs) are allocated by the loader communicating with the SP manager and the SP manager records a start position into an SP table; SPRs are freed by the SP manager circulating start pointer references from the Used Queue through the plurality of NFA cells, the reaper and the harvester and transferring any SPR that is reported unused by the plurality of NFA cells, reaper and harvester to the Free Queue, and the SPRs are used within the NFA cells and transferred from one cell to another along with NFA state transitions.

BRIEF DESCRIPTION OF THE DRAWINGS

FIG. 2 shows the sequence of active states for a sample input string.

DETAILED DESCRIPTION OF THE EMBODIMENTS

Figure 1:
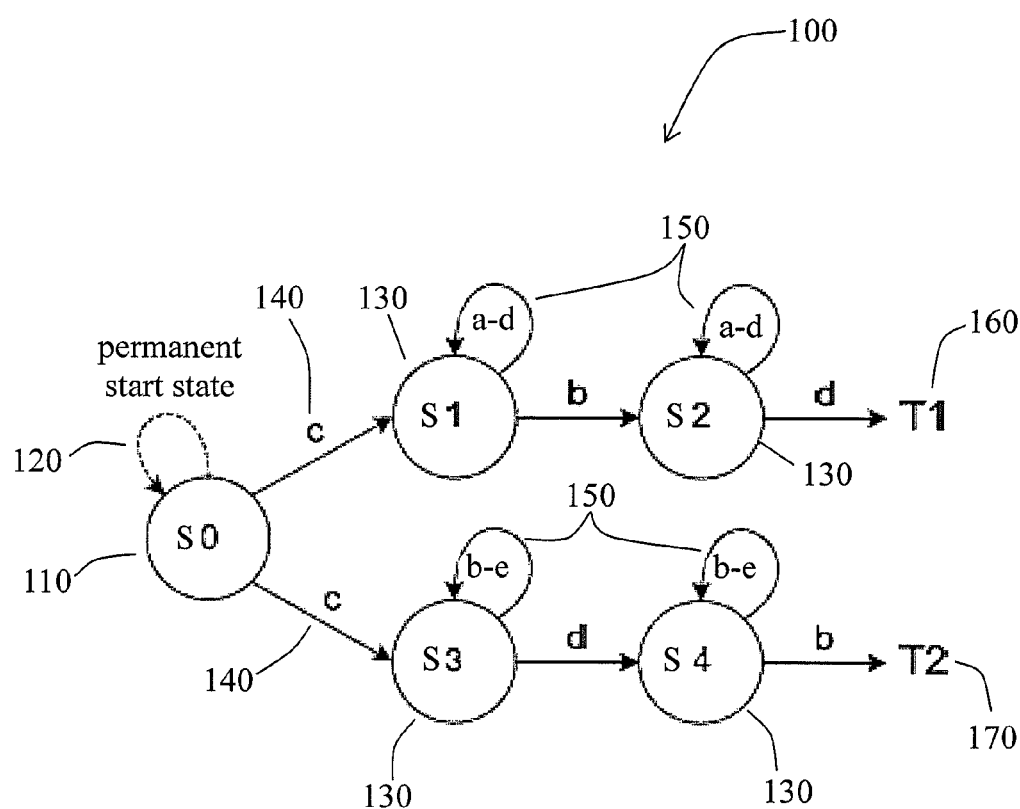
FIG. 1 is an NFA graph for a sample input stream.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
- the sequence of characters "car" appearing consecutively in any context, such as in "car", "cartoon", or "bicarbonate"

the sequence of characters "car" occurring in that order with other characters between them, such as in "Icelander" or "chandler"

the word "car" when it appears as an isolated word the word "car when preceded by the word "blue" or "red"

the word "car" when not preceded by the word "motor"

a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To match regular expressions or similar pattern matching rules, two main types of state machines may be constructed, nondeterministic and deterministic finite automata (NFAs and DFAs). NFAs for multiple rules are commonly executed separately, either in a sequential manner as in software, or in a parallel manner as in hardware.

Abstractly, an NFA is a directed graph of NFA states, in which each graph edge is labeled with a class of input symbols that it accepts, representing a transition from a source state to a destination state on a particular symbol class. Classically, one "start state" is understood to be "active" at the beginning of a stream, or sequence, of input symbols. As each symbol in the stream is consumed, an active state may transition to a destination state along a graph edge labeled with a class containing that symbol, so that the destination state becomes active after that symbol. An NFA may be constructed to match one or more regular expressions or similar rules, with states and transitions corresponding to the rules such that some state will be active if the input symbols so far consumed form the beginning of a possible match to some rule. Each rule corresponds to at least one special "accepting state," which becomes active when the rule has been completely matched by the input symbols consumed.

Various distinct NFAs may generally be constructed to match the same rule or set of rules. Such NFAs may have different graphs, but still be functionally equivalent in the sense that appropriate accepting states become active in each equivalent NFA after consuming symbols matching any of the rules. Also, NFA graphs may have "epsilon transitions" or "epsilons", often drawn as graph edges labeled with a Greek letter Epsilon (ε) instead of a symbol class. Unlike ordinary transitions, epsilon transitions are followed without consuming any input symbol. Epsilons are useful for many algorithms, but well known algorithms can transform any NFA into an equivalent epsilon-free NFA.

Unlike in a DFA, a single NFA state may have multiple out-transitions labeled with classes containing the same symbol. When such a state is active, and such a common symbol is consumed, there are multiple out-transitions that could be taken, and there is no fixed way to determine which transition to take. This is the "non-deterministic" aspect of an NFA. Depending on input symbols not yet consumed, one of these possible transitions may lead to an accepting state while another does not, so to detect all matches it is important to take the right transition. There are two well-known methods of executing an NFA to determining which of any possible transitions may lead to an accepting state.

One method is by recursive execution. When multiple transitions are possible, an arbitrary one is taken, to see if it leads to an accepting state. If matching fails by this path, execution of the NFA returns to the state that branched into multiple transitions and tries another branch. Transition choices and input symbols are reverted by popping off of a stack until an active state is reached with a different transition possibility, which is then taken. In this manner, execution wanders recursively along various paths through the NFA graph until an accepting state is reached, or no alternative paths remain. Recursive execution is a time extensive process for extensive or complex NFAs.

Another method is sometimes referred to as a Thompson NFA. When an active state has multiple out-transitions matching the next symbol, all of these transitions are taken simultaneously, activating multiple destination states after consuming a particular symbol. Thus, after each input symbol is consumed, any number of NFA states may be active, from zero states to all of the NFA states. Thompson NFA execution is a process of tracking an active state subset as it evolves with each symbol consumed. Any time the active state subset includes one or more accepting states, corresponding rules have been matched. No stack is required, nor backing up in the symbol stream to where the previous branching occurred. A single pass over the input symbols is sufficient to find all matches.

Parallel hardware NFA engines typically use a Thompson implementation. In such an engine, multiple NFA cells exist as physical logic within a cell array. Each cell is often configured to track one or more NFA states derived from the rules. The states tracked by a cell may be active or inactive, and cells are able to signal to other cells and activate them, such as signals representing state transitions. The cell array is initialized with start states active and input symbols or information corresponding to those symbols are broadcast to the cells. Logic associated with each transition is configured to detect the proper symbol class, and examines each input symbol to determine if it belongs to the transition class. Whenever a state is active and the next symbol matches a transition class, a signal is sent to the destination cell.

The cell array may be statically configured with an entire NFA before scanning an input stream, such that every NFA state is represented by some cell. Alternatively, according to the methods of U.S. Pat. No. 7,899,904, titled "Hardware Processing of Regular Expressions" to Michael, D. Ruehle, cells may be dynamically reconfigured on demand during a scan, so that the cell array does not need to be large enough for the entire NFA, but only large enough for active state subsets achieved during a scan. As taught in the '904 patent, a single cell may represent more complex sub-graphs of multiple NFA states. When a cell is dynamically configured, signal connections are also configured between the cell and its destination and source states in the cell array.

For any such hardware NFA engine comprising such a cell array, whether statically or dynamically configured, it is desirable to report an identifier (ID) of each rule match detected, along with the location of that match in he symbol stream. A match location may equivalently be reported as a Start Position (SP) and length, or an End Pointer (EP) and length, or simply SP and EP, or other representations. Thus, desired match information can be seen to comprise ID, SP, and EP. Determining ID and EP associated with a match is straight forward. The ID of each rule may be configured into its corresponding accepting state cell(s) which will report that ID whenever they become active. The EP of a match is easily determined as the position of the last symbol consumed to complete that match and can often be taken straight from the Current Pointer at the time.

Reporting match SPs for a Thompson NFA hardware engine requires more. Typical of Thompson NFAs, matching can begin in one cell and complete in a different cell. Also, many matches or partial matches may overlap with each other in the symbol stream, so that many potential match SPs may be currently associated with active states at any given time. The cell beginning a match can easily determine an SP corresponding to the first matching symbol, but beginning a match does not guarantee the match will complete, and many match beginnings may be detected with different SPs. The cell completing a match does not easily know in which cell a match began, what SPs are determined there, or which of those SPs applies.

In a hardware engine finding rule matches within an input stream by executing a Nondeterministic Finite Automaton (NFA) with active states tracked in parallel cells, a start pointer (SP) is captured by the cell beginning a match, and passed from cell to cell until the match completes. The SP is reported by the cell ending the match. For multiple overlapping matches, different cells may hold different SPs, and a cell representing multiple NFA states may hold multiple SPs. Methods are given to select one SP when multiple SPs collide in the same state. Transmissions of SPs from cell to cell may be delayed a cycle behind state transitions to improve logic timing. For reduced logic cost, shorter SP references (SPRs) may be allocated to represent active SPs, tracked by NFA cells in place of actual SPs. The SPRs are de-referenced when a match is reported and de-allocated when no longer in use. Tracking SPs in an NFA can be specifically applied to dynamically reconfiguring NFA cell arrays.

In a method of the invention, SPs are tracked within and among the active NFA cells of a hardware NFA cell array, whether statically or dynamically configurable. A given SP value is established in a cell where matching begins, and is transmitted from one cell to another as a result of NFA state transitions between those cells. As symbols are consumed and matching progresses, the original SP value will travel through the cells participating in the match. The SP value will always reside in cells which are active after consuming the latest symbol in an input stream. When matching reaches an accepting state, the SP value will reach it as well, and thus it will be able to report the SP with other match information such as ID and an EP value.

An NFA cell may carry actual SP values or they may similarly carry other information which enables an NFA system to determine an SP value. For example, NFA cells may carry start pointers plus or minus an offset value, e.g. SP+1, SP−1 or SP−2. Also, cells may carry references to SP values which are stored separately, such as in a shared memory. Cells may also carry representations of their match lengths to the current symbol position, such as 1 after matching begins in one cell, 2 in the next cell after consuming another symbol, 3 in the next cell after consuming another symbol and so on. It is understood that where the description of the invention refers to tracking an SP value that any units of information may be tracked which enable retrieval or determination of an SP.

In a Thompson NFA execution, an active subset of all possible NFA states is tracked. Each active state has a corresponding SP. When a state is activated by a transition from a start state while consuming an input symbol, a match is beginning. The activated state receives an SP equal to the position of the consumed symbol. When a destination state is activated by a transition from a source non-start state while consuming an input symbol, the SP held by the source state prior to consuming the symbol is transferred and becomes the SP held by the destination state after consuming the symbol. Every active state except a start state has some SP associated with it. That SP will have originated when a match began with a transition from a start state, and moved in a continuous chain of state transitions to its current location. When an accepting state is active and reports a match, it reports an SP it is currently associated with and an EP equal to the position of the last symbol consumed. Because of the way an SP travels in a continuous chain of state transitions from a start state to an accepting state, every SP-EP pair reported corresponds to an actual continuous match by the NFA—by the generating regex or rule.

For purposes of example, FIG. 1 is an NFA graph for a sample input stream and shows a ruleset containing the following two regular expressions is used:

c[a-d]*b[a-d]*d<<  OUTPUT 1>> c[b-e]*d[b-e]*b<<  OUTPUT 2>>.

The sample data stream for our example is:
dcdcabdebdcdedededbcebdccccdddecbddacdbe The graph 100, in FIG. 1, has a root state (S0) 110 which has a permanent start state loop 120 denoted by a dotted-line arrow. There are four non-root states 130 labeled S1 to S4 and several transitions 140 denoted by solid-line arrows. Some transitions progress to another state 130 and others loop from a state to itself 150. These loops 150 back to a same state correspond to the [a-d]* and [b-e]* spinners. Taking any transition from one state to a next state consumes one input character. Each transition is labeled with the character or class of characters that must be matched to take the transition. The permanent start state loop is an exception to the character consumption requirement for transition. As noted, the dashed loop from state 0 to itself, which is valid for any character denotes a permanent start state (PSS). S0 110 stays active continually because the expressions are un-anchored and can match anywhere in the data stream.

On consuming the letter 'c' at the first location in the data stream, S0 110 transitions to states S1 and S3. There is also a transition to S0 as always. Transitioning to multiple destination states on the same character is what the word "nondeterministic" refers to in NFA. One cannot tell which is the preferred transition. It could be either or both as either or both could lead to a transition or not. The top 'c' branch is for matching the first expression, and the bottom branch for the second expression. In other examples, expressions may share more than just a start state.

From S1, there are two choices to continue matching. S1 will remain active with any letter from 'a' to 'd'. This is called "spinning", as is understood in the art, when a state is re-entered with a single character. Also, S2 will become active with a 'b'.

In S2, another spinning state will occur with [a-d]. Also, if a 'd' is consumed from S2, a first expression is matched and a token is output. It is understood in FIG. 1 that the accepting states are not shown, but are often hidden in this type of diagram, and are the positions shown by T1 160 and T2 170. The token ID for this match will be 1. The token's EP will be the location of the matching 'd' and the SP will indicate the original 'c' consumed to transition from S0 to S1.

S3 and S4 operate in a similar manner to S1 and S2. A match at S4 upon consuming a 'b' will output a token with ID=2 and the EP will be the location of the matching 'b' and the SP will indicate the original 'c' consumed for transition from S0 to S3.

FIG. 2 shows the sequence of active states for a sample input string. The first column shows the Current Pointer (CP) 210 update with consummation of each symbol in the sample input stream 220. The states 230 of the NFA become active as each symbol is consumed. Each character consumed is shown in a column 240 next to the active states column 230. Token outputs 250 are shown for matches. Each token will have an ID, SP and EP. Note that state 0 is always active for NFA execution in an embodiment of the invention. The active states 0 to 4 referenced in column 230 correspond to states S0 to S4 in FIG. 1, from the same two example rules:

c[a-d]*b[a-d]*d<<                                           OUTPUT 1>> c[b-e]*d[b-e]*b<<                                           OUTPUT 2>>.

It is noted that the example NFA and rules are small and simple.

As the first symbol comes into the NFA engine, 'd', no transitions are made to any destinations states. The CP 210 is updated to CP=1 and character 'c' is consumed. Transitions are made to states S1 and S3. S0 remains active. At this point three states are active, as indicated by "states=0, 1, 3" in the third entry of column 230. The transitions continue as shown in FIG. 2 until the 40 symbols are consumed.

Accordingly, in FIG. 2, non-determinism is handled by the invention not with recursion but by tracking multiple NFA states simultaneously. This allows a single continuous scan to find all matches. This also allows for leveraging of hardware parallelism.

An embodiment of the invention begins with start states, and evolves the state set one data byte at a time. Each clock cycle every active state in the set tests its character classes, and may stay active by spinning or transitioning to other states in the active set, or enlarge the active set by transitioning to other states. All transitioning and spinning may occur in parallel.

The embodiment of the invention scans the 40 bytes of FIG. 2 in 40 steps—a single continuous scan. The complexity of overlapping match possibilities is modeled by an active state set. There is no need for a large numbers of states or instructions to model a complex scan just as there is no need for multiple passes through the data input stream. Tokens are output whenever an end of match is reached. Accordingly, tokens can be sorted by EP. As noted, it is relatively simple to determine the EP for any match because it will correlate almost directly to the CP at the time of the match. Also as noted, the appropriate SP may not directly correlate to a simple state transition progression. This is so because during the simple scan hi-lighted in FIG. 2, the active set of states has no inherent memory of how states were activated—or when matching may have begun.

As seen in FIG. 2, there are tokens that overlap each other. This includes tokens with the same ID and SP but with different EPs. However, there are never matches with the same ID and EP. Generally speaking, in an embodiment of the invention, each expression will only be matched once at each EP.

As noted, it is possible for two distinct active NFA states to transition to the same destination state simultaneously. This can happen when the same input symbol is consumed. In an embodiment of the invention, two SP values (distinct or equal) may attempt to state transfer into a single destination state. Such an event is a "collision".

In an embodiment of the invention, collisions are resolved by enabling each NFA state to carry multiple SP values. Multiple SP values in a single NFA state may comprise a list. The list may be limited in length or not limited in length.

When two SP values collide at a common destination state, both values may be placed into that destination state after the symbol is consumed. When an accepting state is active with multiple SP values present it could report multiple matches. All matches would have the same ID and EP, but each would have a different SP value. Tracking multiple SP values per NFA state provides for being able to report every matching SP/EP pair. In NFA cell arrays, tracking and reporting multiple SP values per NFA state and reporting every matching SP/EP pair increase storage requirements and requires managing lists of SP values for each NFA state.

In an embodiment of the invention, collisions may be resolved by arbitrarily selecting one incoming SP value to store in a destination state. Other SP values would be dropped. This allows for efficient usage of logic for hardware NFA cells because only one SP value per state is maintained and moreover provides for simplicity in selection due to the arbitrary manner. However, an arbitrary selection of an SP results in the fact that not all possible SP/EP match pairs for each rule—and consequently not all ID/SP/EP triples—may be reported. Even so, useful match reporting behavior is guaranteed. Specifically, considering the set of all valid ID/SP/EP match triples for a given rule set, input sequence, and NFA graph, every distinct ID/EP pair is guaranteed to be reported with at least one corresponding SP value. The risk of missing a single isolated match or missing any match when multiple rules are each matched once is eliminated. If the matches to a given rule do not overlap, all matches will be reported. The only loss is that when a single rule matches multiple symbol sequences overlapping such that they share the same last symbol, not all of those matches may be reported. Whereas many applications are not concerned about multiple overlapping matches to the same rule and only require one match to be reported from an overlapping set, this limitation is often acceptable.

In an embodiment of the invention, collisions may be resolved by selecting one incoming SP value to store in the destination state according to specific (non-arbitrary) policies. Other SPs will be dropped. This collision policy allows for keeping the smallest SP value which results in the longest possible match being reported for each ID/EP pair. This also allows for keeping the largest SP value which results in the shortest possible match being reported for each ID/EP pair. In hardware NFA cell arrays, this policy can result in comparing potentially large quantities of SP values arriving at a given destination, which may be expensive.

In an embodiment of the invention, when an active state transitions to itself, its current SP value is retained regardless of other incoming SP values. This allows for low cost resource usage and provides additional stability to SP tracking.

Figure 3:
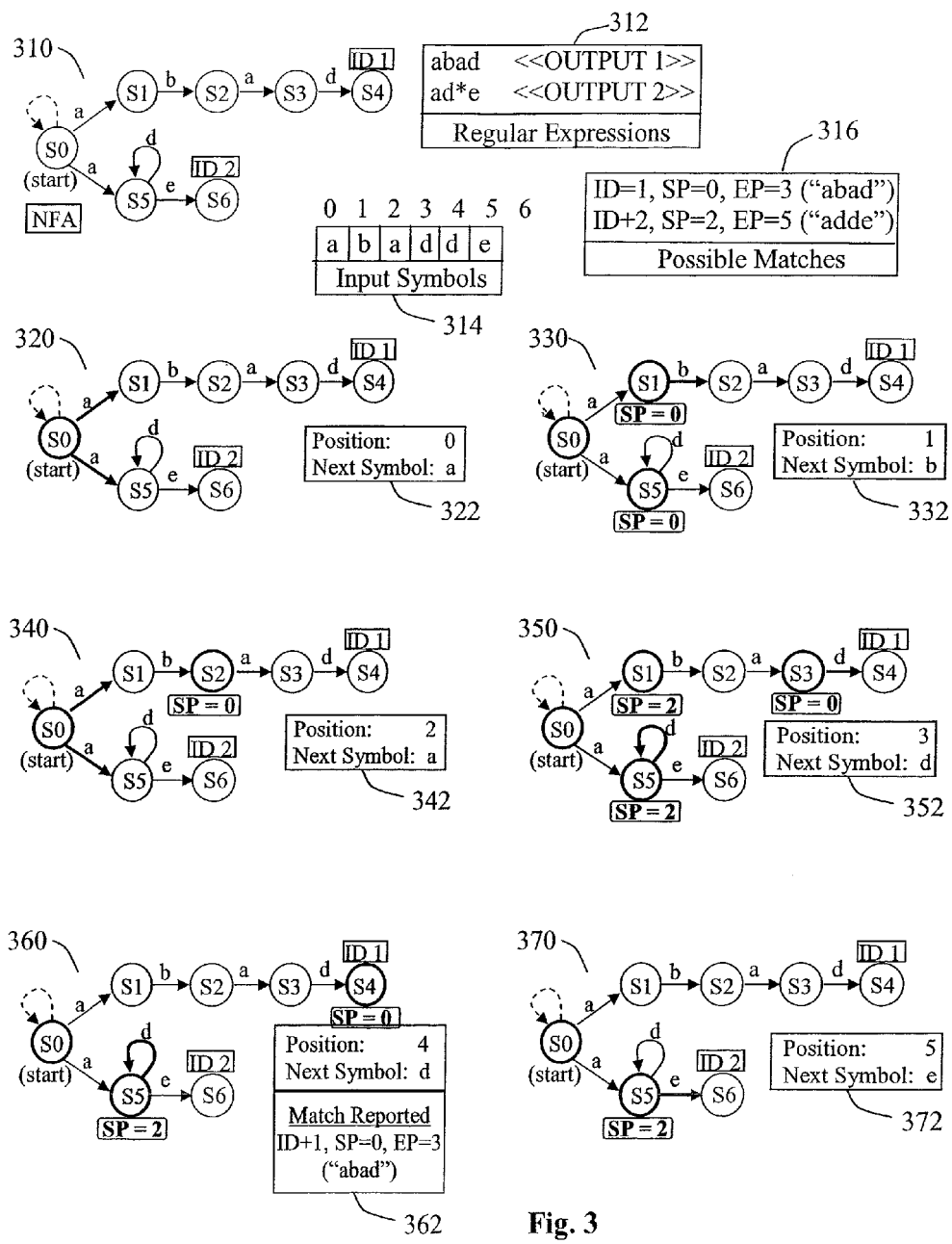
FIG. 3 is a series of NFA graphs showing SP tracking.

FIG. 3 is a series of NFA graphs showing SP tracking. An initial NFA graph 310 shows the states of an NFA derived from the rule set 312. A first rule is 'abad' and the second rule is 'ad*e'. The input symbols 314 for purposes of example are 'abadde'. Possible token outputs 316 for the given input stream are Token 1 (ID=1, SP=0, EP=3 (abad)) and Token 2 (ID=2, SP=2, EP=5 (adde)). In FIG. 3, the process of the NFA execution is shown one consumed symbol at a time. Active states and transitions to destination states are shown in each NFA graph in bold. Active states other than start states indicate SP values. The sequence of figures in FIG. 3 illustrates the transfer of SP values from state to state according to an embodiment of the invention.

The first character in the input stream is 'a'. A status box 322 indicates the CP of the NFA and the next symbol to be consumed for ease in reference—CP=0 and the next symbol is a. The second NFA graph 320 shows start state S0 active, and the transitions to S1 and S2 based on the consumption of 'a' according to the two rules in the ruleset 312. The transition will communicate SP=0 to all of the destination states. In this case, the destination states are S1 and S5.

The third NFA graph 330 indicates that states S1 and S5 have become active upon consumption of the 'a' as the first symbol of the input stream 314. Also, note that 51 and S5 now indicate that the SP of the thread is SP=0. Also, S0 remains active since it is the start state of the NFA. In the third NFA graph 330, the second symbol, 'b' is consumed. The transition from S1 to S2 is shown upon consumption of 'b'. Status box 332 also now shows the CP=1 and the next symbol is 'b'. The SP information is passed to the destination state from S1. S5 does not have a destination state since a match requirement was not met, no SP will be sent.

The fourth NFA graph 340 of FIG. 3 shows the active states as S0 (which is always active) and S2. The SP at S2 will indicate SP=0 as passed from 51 to S2. The status box 342 indicates that CP=2 and the next symbol is 'a'. The symbol 'a' is consumed and the fourth NFA graph 340 shows two transitions from S0 (to S1 and S5) and a transition from S2 to S3. An SP for each transition to a destination state will be sent with the transition. The SP for destination states S1 and S5 is SP=2 and the SP for the transition to destination state S3 is SP=0.

The fifth NFA graph 350 shows active states S0, S1, S3 and S5 active after the previous transitions. The SP for S1 and S5 is SP=2 and the SP for S3 is SP=0. The status box 352 indicates that CP=3 and the next symbol is 'd'. The symbol 'd' is consumed and the fifth NFA graph 350 shows a transition from S3 to S4 and a transition from S5 to itself. S5 is accordingly a spinning state. Each transition to a destination state, S3 to S4 and S5 to itself passes the SP associated with the transition.

The sixth NFA graph 360 shows active states of S0, S4 and S5. State S4 is an accepting state. Token 1 (ID=1, SP=0, EP=3) will be reported. The reported EP=3 is simply one less than the current position CP=4, because the last symbol of the match was consumed in the previous step. The status box 162 indicates that CP=4 and the next symbol is 'd'. S5 will transition to itself and maintain the SP as SP=2.

The seventh NFA graph 370 shows the transition to S6. The status box 172 indicates that CP=5 and the next symbol is 'e'. The symbol 'e' is consumed. The destination state is S6 which is an accepting state. Token 2 (ID=2, SP=2, EP=5) will be reported at CP=6 (not shown).

In each of the matches exemplified in FIG. 3, a transition to a destination state was shown, i.e. S3 transitioned to S4 and S5 transitioned to S6. It is understood that a transition to a "final accepting" state may not occur. A transition to the final accepting state may occur where the final accepting state is responsible for reporting the match. However, it is also understood that the state which consumes the final symbol in a match, S3 or S5, may not actually transition to a destination state. Rather, execution of an instruction at S3 or S5 based on the next input symbol may directly cause output of the appropriate token information. FIG. 1 is shown with the final accepting state for illustration purposes.

Many aspects of the invention are illustrated in FIG. 3. Non-determinism is illustrated in the transition from S0 to S1 and S5 at the second NFA graph 320. SP values are transferred from state to state along with the state transitions. This is shown, for example, in the transition from S1 to S2 in the third NFA graph 330 resulting in SP=0 being transferred to S2 in the fourth NFA graph 340. There are also multiple instances of the same SP value held by distinct states. In the third NFA graph 330 states S1 and S5 both hold SP=0. There are instances of multiple distinct SP values held by distinct states associated with distinct expressions. In the fifth NFA graph 350, S3 holds SP=0 for one expression, and S5 holds SP=2 for another expression. There are instances of multiple distinct SP values held by distinct states associated with the same expression. In the fifth NFA graph 350, S1 and S3 have distinct SP values SP=2 and SP=0 for the same expression. There are multiple instances of accepting states becoming active and reporting match information comprising ID, SP and EP. States S4 and S6 are accepting states that report match information comprising ID, SP, and EP.

Figure 4:
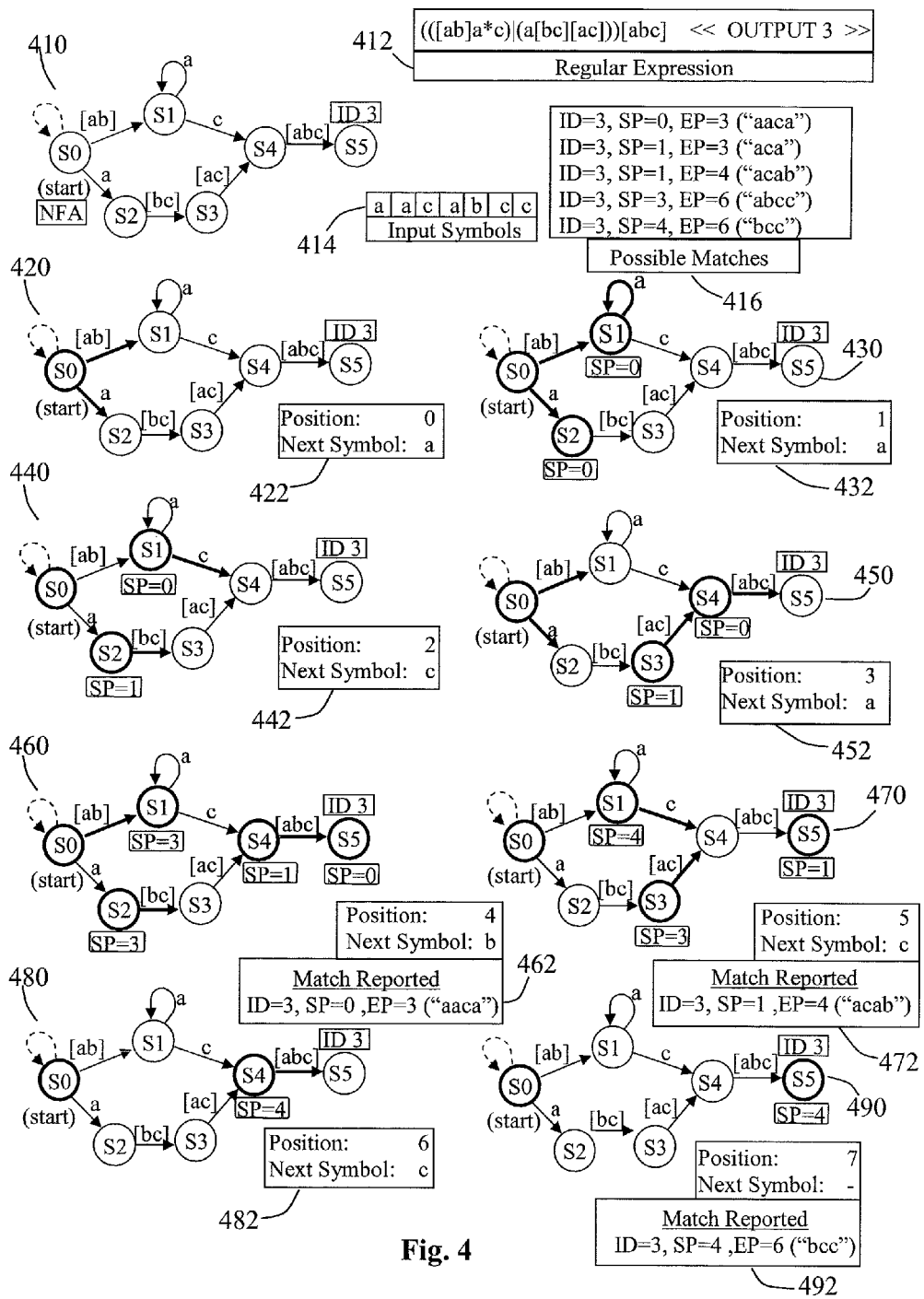
FIG. 4 is a series of NFA graphs showing SP tracking with colliding states.

FIG. 4 is a series of NFA graphs showing SP tracking with colliding states. An initial NFA graph 410 shows the states of the NFA derived from the rule sets 412. The rule being used as an example is '(([ab]a*c)|(a[bc][ac]))[abc]'. The input symbols 414 for purposes of example are 'aacabcc'. Possible token outputs 416 for the given input stream are shown in the possible matches box 416 for reference purposes. In FIG. 4, the process of the NFA execution is shown one consumed symbol at a time. Active states and transitions to destination states are shown in each NFA graph in bold. Active states other than start states indicate SP values that are passed to destination states in transitions. The sequence of figures in FIG. 4 illustrates the transfer of SP values from state to state and collision states according to an embodiment of the invention.

The first character in the input stream 414 is 'a'. A status box 422 indicates the CP of the NFA and the next symbol to be consumed for ease in reference—CP=0 and the next symbol is a. The second NFA graph 420 shows start state S0 active, and the transitions to destination states S1 and S2 upon consumption of the first symbol 'a'. The transition will communicate SP=0 to all of the destination states.

The third NFA graph 430 indicates that states S1 and S2 are active. SP=0 for both S1 and S2 at this point in the transitions. S0 is also active. Also, active states S1 and S2 indicate the SP of SP=0. The next symbol consumed is 'a' at position CP=1 in the input stream as indicated by the status box 432. The transitions are indicated to be from S0 to S1 and S2 and from S1 to itself. S1 is a spinning state.

The fourth NFA graph 440 indicates that states S0, S1 and S2 are again active after the previous transition. However, the SP information passed in the previous transition is changed. The SP at S1 is SP=0. The SP at S2 is SP=1. Two transitions transitioned into destination S1—from S0 and from itself. This is a "collision" of state transitions. The state Si selected SP=0 for the SP value. As noted above, the policy could range from arbitrary to lowest or highest SP value, or the policy can retain an existing SP value in preference to a new one. The SP value at S2 is SP=1. This is based on the transition from S0 from the second symbol in the input stream which was at CP=1. The next symbol consumed is indicated at the status box 442 as 'c' in position CP=2. The transitions are indicated to be from S2 to S3 (with SP=1) and from S1 to S4 (with SP=0).

The fifth NFA graph 450 indicates that states S0, S3 (SP=1) and S4 (SP=0) are active after the previous transition. The next symbol consumed is 'a' at position CP=3 as indicated by the status box 452. S0 (SP=CP=3) will transition to S1 and S2. S3 (SP=1) will transition to destination state S4. S4 (SP=0) will transition to destination state S5. S5 is an accepting state and will output token information.

The sixth NFA graph 460 indicates that states S0, S1, S2, S4 and S5 are active. The next symbol consumed is 'b' at CP=4 as indicated by the status box 462. S5 will report a match at ID=3, SP=0, EP=3. This relates to a match for the 'aaca' string of characters in the input stream 414. S0 (SP=CP=4) will transition to destination state S1. S2 (SP=3) will transition to destination state S3. S4 (SP=1) will transition to destination state S5. S5 is an accepting state and will output token information when active.

The seventh NFA graph 470 indicates that states S0, S1, S3 and S5 are active. The next symbol consumed is 'c' at CP=5 as indicated by the status box 472. S1 (SP=4) will transition to destination state S4. S3 (SP=3) will transition to destination state S4. Again, two transitions transitioned into the same destination state. Both S1 and S3 transition into S4 with different SP values. This is a collision of state transitions. State S5 is also active. S5 will output a token with ID=3, SP=1 and EP=4. This relates to a match for the 'acab' string of characters in the input stream 414.

The eighth NFA graph 480 indicates that states S0 and S4 are active. State S4 holds SP=4, which was selected to resolve the collision in the seventh graph 470 between SP=4 from state S1 and SP=3 from state S3, such as selecting one of these SP values arbitrarily. The next symbol consumed is 'c' at CP=5 as indicated by the status box 482. S4 (SP=4) will transition to destination state S5.

The ninth NFA graph 490 indicates that S0 and S5 are active. The next symbol consumed is 'c' at CP=6 as indicated by the status box 492. S5 is an accepting state and will output a token with ID=3, SP=4 and EP=6. This relates to a match for the 'bcc' string of characters in the input stream 414.

Many aspects of the invention are illustrated in FIG. 4 additional to those illustrated in connection with FIG. 3. A transition with multi-symbol classes is illustrated in the second NFA graph 420 in the transition from S0 to S1 on the symbol class [ab]. This is also demonstrated in the fifth NFA graph 450 in the transition from S3 to S4 on the symbol class [ac]. An active state transitioning to itself while a distinct source state also transitions to it is shown in the third NFA graph 430 when state S1 transitions to itself on symbol 'a' and state S0 transitions to S1 on symbol class [ab]. Also demonstrated in the collision at S1 is the dropping of an SP value. As noted in the fourth NFA graph 440, the SP value at S1 is SP=0 even though the SP value from the S0 transition was SP=1. Also demonstrated is that matches were found for all possible EP values in the input stream, specifically EP=3, EP=4, and EP=6. However, some associated SP values were not reported due to SP values being dropped due to state transition collisions. With EP=3, only SP=0 was reported, although another possible match was (ID=3, SP=1, EP=3). With EP=6, only SP=4 was reported, although another possible match was (ID=3, SP=3, EP=6).

In an embodiment of the invention, SP values are tracked in an NFA state machine by cells in hardware. Cell arrays used in NFAs are known in the art. A cell is a physical element where a hardware or software model of an NFA state may reside. It is understood that a classical NFA state is such that there is no internal complexity. In essence, a simple NFA state is a stepping stone to another NFA state until a match is found or not found. A complex NFA state, on the other hand, is such that states are organized into a subset of states and a mini NFA graph results, also known as a complex NFA state. It is understood that a state may occupy multiple cells or a cell may contain a complex NFA state. A method of tracking active states of an NFA machine is discussed in the '904 patent. It is not viable to have a cell for every NFA state due to cost and size considerations. Accordingly, active states can be fitted into a set of reconfigurable cells. Every cell is able to connect (transition) to every other cell in an array as discussed in the '904 patent. This may entail a full crossbar connection.

There are several differences between state to state and cell to cell transitions. Matching may initiate differently in a cell array. Also, there may be multiple start states. For consistency, each active start state may be considered to have an SP value (either a valid or null value) which updates to the appropriate SP each time the first symbol of a potential match is consumed. Further, especially in dynamically configurable cell arrays, it is advantageous to have the beginning part of an expression (an initial fragment) matched outside the cell array by other means, such as by hash tables or a DFA. When an initial fragment is externally matched, the cell array is signaled to activate a corresponding non-start state at a corresponding symbol position in the input stream. In this case, the SP value does not originate in an NFA start state within the cell array, but rather the SP value must be identified by the entity matching the initial fragment, and provided along with the signal to activate the corresponding non-start state. The externally provided SP value is then stored in the cell containing that state, and SP tracking continues within the cell array from there.

Cells in a hardware cell array may be "complex"—configurable to represent a sub-graph of multiple NFA states, rather than a single NFA state. This is especially advantageous for dynamically configurable cell arrays. For example, a single cell may be able to represent a "spinner"—a quantified symbol class—followed by another symbol class, such as '[a-z]+[abc]' or 'a{3,15}b' or '[0-9]{0,50000}x'. These examples are classically 2, 16 and 50,001 NFA states respectively, but in appropriate hardware architectures, it is practical to represent each in a single cell. For further examples, a single cell may be able to match a sequence of symbols such as 'abcdef' or 'matchme', or a sequence of symbol classes such as '[ABC]a[bc][0-9]xy', which classically require a chain of NFA states, one per symbol or class. Or a cell may be able to represent a spinner/sequence combination, such as '[0-9]{10,12}abc[0-9]xyz'. A cell may also be able to represent various modern extensions to classical regular expression syntax which do not have simple mappings to classical NFAs, such as anchors to the beginning or end of a word, line, packet, or stream, lookahead or lookbehind assertions and numerical comparisons. These modern extensions to classical regular expression syntax are known in the art and are provided for example purposes only. There may be other known modern extensions to classical regular expression syntax.

When cells represent complex structures, SP tracking within the cell can become correspondingly complex. For one thing, when a cell represents multiple NFA states, it may be necessary for the cell to store a separate SP value for each state within the cell. For example, a cell representing 'a{3,15}b' may internally process an array of 16 distinct NFA states which may be independently active or inactive, and each active state among the 16 could have a distinct SP value within the cell. In some situations, a single SP value may be sufficient for a complex cell representing the equivalent of many NFA states. For example, according to methods taught in the '904 patent, a cell may track '[0-9]{0.50000}x' using a single binary counter rather than 50,001 independently active or inactive states, and a single associated SP value would be appropriate.

An SP collision at a complex cell may be advantageously resolved by a particular policy. As an example, a cell representing a spinner such as '[A]{N,M}', where [A] is a symbol class, and N<M are non-negative integers, but M may be infinity (written as '[A]{N,}'). As described in the '904 patent, the {N,M} quantifier may sometimes be represented by a binary counter incrementing from 0 to M, or the infinite {N,} quantifier by a counter incrementing from 0 to N. A collision is possible if the class [A] is matched by the next symbol so that the counter should increment and the same symbol also causes a state transition into this cell, which should reset the counter to zero. As described in the '904 patent, in some cases, including when M is infinite, correct matching occurs if the counter increments rather than resetting. In such cases, an advantageous policy is for the cell's current SP value for the spinner to be retained, and the incoming SP value associated with the in-transition to be discarded. In some cases, including when N is zero, correct matching occurs if the counter resets to zero rather than incrementing. In such cases, an advantageous policy is for the incoming SP value associated with the in-transition to be captured by this cell, and the current SP value for the spinner to be discarded.

For a hardware NFA cell array to track SPs according to the methods of this invention, a physical mechanism may be required to transmit SP values from one cell to another along with inter-cell state transitions. For a given cell array architecture, the SP transmission mechanism may be similar and parallel to the mechanisms for signaling inter-cell state transitions. For example, if a large statically configured cell array has a statically configurable routing network to signal transitions from each cell to nearby cells, that network may be extended, e.g. by adding more parallel wires along the same topology, to transmit an SP value along with each state transition signal. In a dynamically configurable signaling crossbar that can connect any pair of cells simultaneously, that crossbar may be extended, e.g. by adding more parallel wires along the same topology, to transmit an SP value along with each state transition signal. However, care must be taken to transmit a coherent SP value into a destination cell in the case of an SP collision. When two source cells signal transitions to the same destination cell simultaneously, the multiple transition signals may be reduced to a single signal by a simple OR gate. However, it may not be sufficient to simply OR together multiple SP values having multi-bit binary representations because each bit-slice OR would occur independently, and the result may not be equal to either source SP value. Thus, care must be taken to select a single source SP value to transmit into a destination cell, and transmit the full representation of the selected SP value without interference by other SP values. Advantageously, each source SP value may first pass through a mask unit, which passes the selected SP value unchanged, but replaces the non-selected SP values with zero bits. OR'ing together all the masked SP values will yield only the selected source SP values.

Following is an embodiment of the invention regarding a specific implementation of transmitting a single source SP value to a destination cell, if there are N source cells, each with a state transition signal for the destination cell, which is '1' when actively signaling and '0' otherwise, and each with a K-bit binary representation of an SP value to transit to the destination cell, which is a valid SP representation when the associated transition signal is '1', and null or undefined value when the transition signal is '0'. The N transition signals enter an N-bit priority encoder, which produces an N-bit select vector, such that at most one select bit is '1', in the same position as some '1' transition bit. For example, the first '1' transition bit in some fixed order is passed through the priority encoder as a '1' select bit, and all other select bits are '0'. Each select bit is connected to one input pin of K AND gates, where the other AND input pin is connected to the corresponding bit of the corresponding source SP value. The output pins of the K AND gates associated with one source cell produce a masked K-bit SP value, which is the source SP value if selected, or all zeros if not selected. All of these masked SP values are then combined by K N-input OR gates, where each OR gate has each input pin connected to a corresponding bit of a corresponding masked SP value. The N-input OR gate may be constructed as a tree of multiple OR gates with 2 input pins or some other number. The K output pins of the K OR gates are connected to the destination cell, transmitting the coherent selected source SP value.

In some cell embodiments, the logic to transmit transitions signals and SP values from cell to cell may be complex, and take significant time to traverse. For example, when a full crossbar is used for dynamically reconfigurable cell array, transmission can require many levels of logic gates, high signal fan-outs, and substantial routing distance across the chip. The logic to select a single source SP value can also be complex and slow, e.g. an N-bit priority encode where there are N participating source cells. Selecting and transmitting SP values can thus be substantially slower than transmitting state transition signals, which do not require priority encoding or masking. In such a case transmitting SP values with the same timing or pipelining as transition signals can adversely decrease the maximum clock frequency the cell array can operate at, thus decreasing net performance. But it may not be advantageous to pipeline state transition signals to achieve higher frequency, because doing so would increase the number of clock cycles between cell updates. One solution would be to pipeline only SP value selection and transmission, to follow one or more cycles behind state transition signals. For example, the N source SP values and the N-bit select vector may be registered at the end of one clock cycle so that mask and OR stages occur in the following cycle, and a selected SP value arrives at the destination cell one cycle "late", but high maximum frequency is maintained because SP selection and transmission are divided between two clock cycles.

In an embodiment of the invention, the cell array may consume a new symbol every clock cycle, so new state transition signals are signaled among cells every cycle, and SP values must also transmit every cycle. A one-cycle (or longer) delay in selecting and transmitting SP values does not preclude this speed, even if an SP value is to be transmitted consecutively from cell A to cell B to cell C. Because the SP is not actually transmitted from cell B to cell C until one cycle later than the transition signal from B to C, the SP value stored in B does not need to be valid until one cycle later than cell B is active. There is time to wait for the SP to arrive from cell A. Thus, delaying SP transmission one or more cycles behind state transition signaling is practical if it is understood that SP tracking in general is similarly delayed behind active NFA state tracking in the cell array. When an accepting state becomes active and reports match information, care must be taken to wait for the accepting state's delayed SP value to update before actually reporting it. This is straightforwardly performed by standard pipelining techniques without any need to stall further symbol consumption by the cell array.

Also of interest for SP tracking in hardware cell arrays is the area and cost of logic. Some applications require matches that may be millions of symbols long. A natural binary SP representation may be 32 bits long for example, giving a range of 2^32 (more than 4 billion) symbol positions. However, if each SP value is K=32 bits, this would require 32 flip flops or memory bits to store one in a cell, 32 wires to transmit, 32 copies of AND and OR gates for masking and selection, etc. In general, the network to transmit SP values may be 32 times larger than the network to transmit state transition signals, which is substantial. This can make SP tracking as a feature very expensive.

The cost of SP tracking can be significantly reduced through the use of SP references (SPRs). Rather than storing and transmitting K, e.g. 32, bit SP values in a cell array, in an embodiment of the invention, R bit SPRs are stored and transmitted. For example, R=9. In this embodiment, an SP table is maintained, which maps SPRs to actual SPs. For example, if K=32 and R=9, the SP table could be 512×32 bits in size, and any of the 2^9 (512) possible SPRs could be used to read a corresponding row of the SP table and retrieve a 32-bit SP. The value of R is chosen to be less than 32.

Use of SPRs in place of SPs requires several operations. Allocation, de-referencing, and garbage collection operations need to be performed. SP allocation is the process of assigning an unused SPR for tracking in the cell array. De-referencing is the process of retrieving the original SP value represented by an SPR, e.g. by reading the SP table. Garbage collection is the process of detecting that a given SPR value is no longer in use within the cell array, and making that SPR value available for future allocations. An SP manager module responsible for these operations can contain an SP table as described, along with a Free Queue containing un-allocated SPR values, and a Used Queue containing allocated SPR values.

Figure 5:
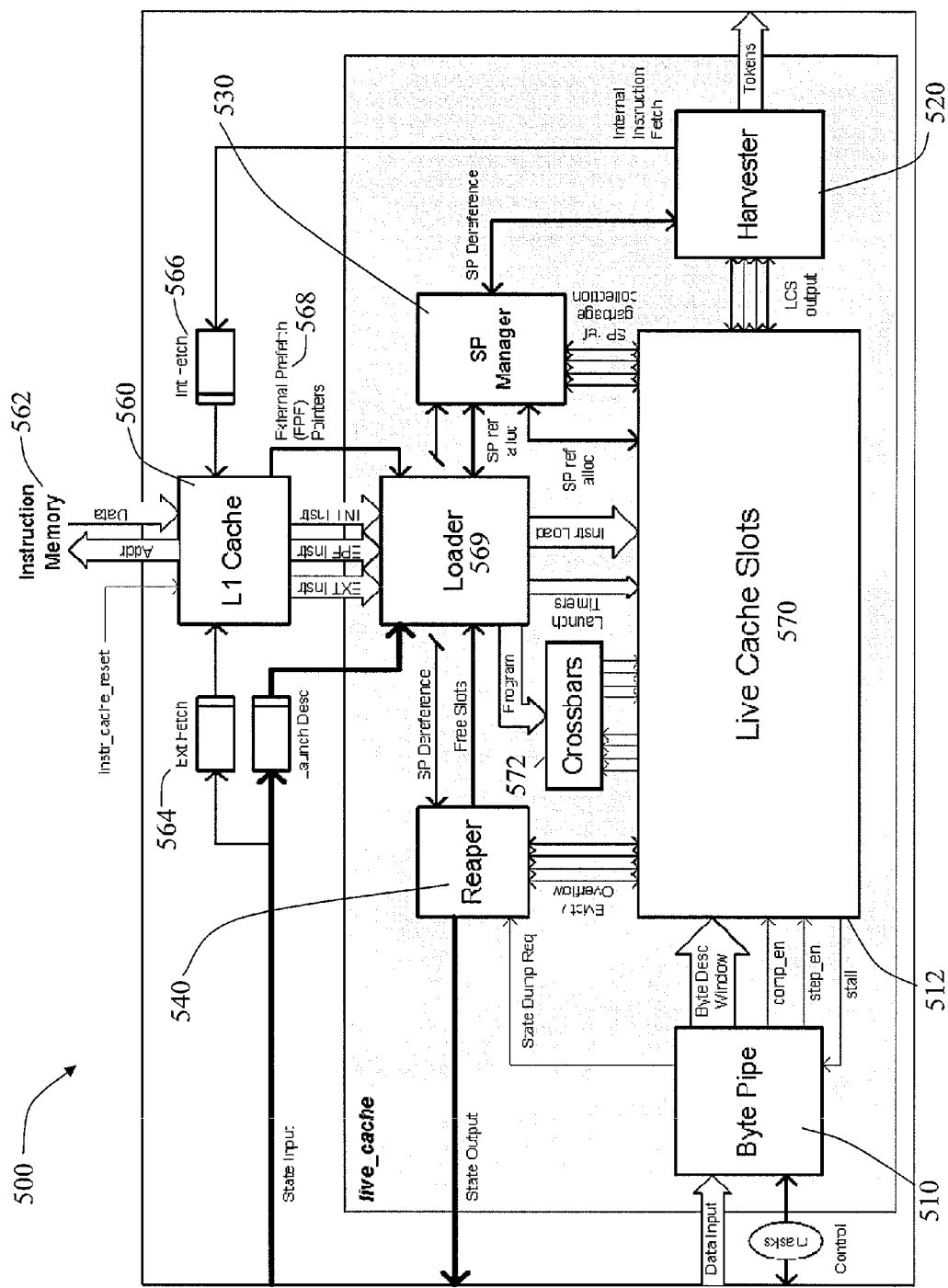
FIG. 5 is a block diagram of an NFA scanning architecture

FIG. 5 is a block diagram of an NFA scanning architecture. The architecture 500 comprises a byte pipe 510, a harvester 520, an SP manager 530, a reaper 540, a loader 569, and a cache 560.

The byte pipe 510 receives a data stream to be scanned. It assembles character class and boundary information and broadcasts a window of descriptors to live cache slots 512. The cache 560 is an instruction cache and local storage of recently used instructions.

The cache 560 reads instructions from an external memory 562 via a memory interface. The cache 560 may arbitrate among four instruction fetch sources: 1) external fetch 564; 2) an internal fetch 566; 3) an external pre-fetch 568; and 4) an internal pre-fetch. The loader 569 receives and decodes instructions from the cache 560. The loader 569 will load instructions into slots in the live cache 570. Crossbar connections between source and destination states in the live cache 570, and between multiple slots in the same state, are programmed as instructions are loaded.

The live cache slots 570 is a pool of engines to represent a full or partial NFA state and track its matching progress. The term "live cache slot" in this embodiment is interchangeable with "NFA cell". Communication between different slots occurs through the crossbars 572. The slots are loaded with instructions one at a time by the loader 569. As each slot is loaded, its crossbar connections to and from other slots are also programmed. Multiple slots may be required to represent a single NFA state, although it is understood that just one slot may be needed. The loader 569 can upload a launch time into any state in the live cache 570, containing a byte distance until the launch, and an associated spin count and SP reference. The same launch timer is sent to all slots in the state simultaneously. The live cache slots 570 track at least one SPR whenever they are live. SPRs are allocated by an SP manager 530 and usually enter the live cache slot 570 from the loader 569. When a permanent start state begins matching spontaneously, the live cache slot 570 will accept an SPR directly from the manager, as opposed to the loader in other situations.

The harvester 520 detects outputs initiated by the transition side of the live cache slots 570. Essentially, tokens are transmitted by the harvester 520.

The reaper 540 essentially performs the opposite task as the loader 569. The reaper removes states from the live cache 570 and transmits the removed states through the output interface.

The SP manager 530 controls the encoding of match start pointers using SPRs. One result of using SPRs is to reduce the logic required to track SPs within live cache slots 570 and to transmit them through the crossbars 572. For instance, from a system utilization perspective, tracking 9-bit references is 72% cheaper than tracking 32-bit SP directly. The SP manager maintains a Free Queue and a Used Queue of SPRs. SPRs may be allocated in two ways. Primarily, when the loader 569 launches an NFA state with a certain SP, it allocates a new SPR from the SP manager 530, which records the SP in its table. Also, a permanent start state in the live cache 570 may spontaneously begin matching, requiring an SPR to represent the current pointer. The SP manager 530 will broadcast a free SPR to all live cache slots 570. If any live cache slots 570 signal back "used", that SPR gets allocated. Otherwise the SPR will be re-circulated.

Figure 6:
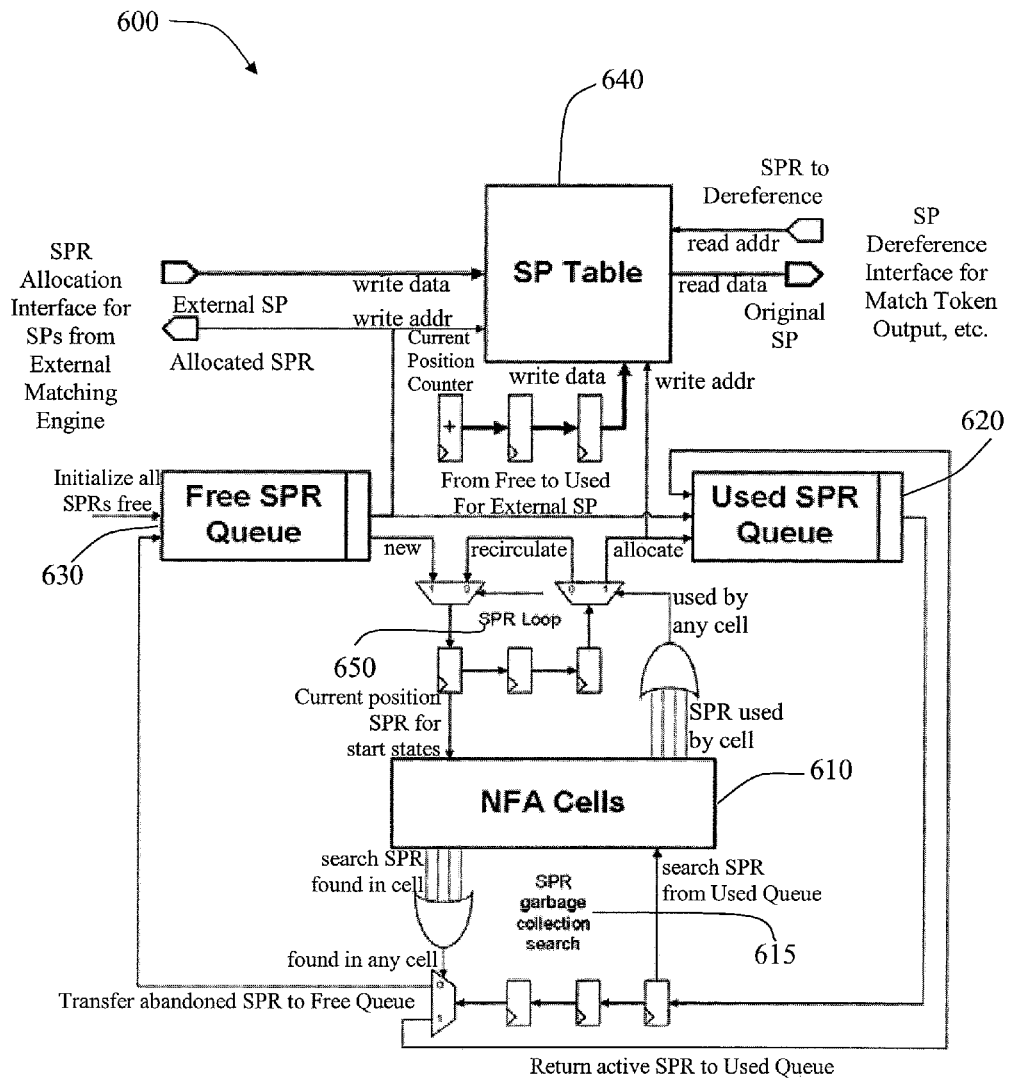
FIG. 6 is a block diagram of an SP tracking system.

FIG. 6 is a block diagram of an SP tracking system. The SP tracking system 600 comprises a plurality of NFA cells 610, a Used SPR Queue 620, a Free SPR Queue 630, and an SP Table 640. The SP tracking system 600 operates using the Used SPR Queue 620, the Free SPR Queue 630 and the SP table 640 as described above. SPRs may be freed by using a garbage collection system 615. It is understood that it may be complicated to proactively signal when an SPR is no longer needed. This is because references may proliferate and expire in complex ways at high speed. The SP manager (FIG. 5) will continually circulate SPRs from the Used Queue 620 through the live cache slots (FIG. 5), the harvester (FIG. 5) and the reaper (FIG. 5). Each of these modules will respond if an SPR is found to be in use. If none of the modules claim to be using an SPR, the SPR will be transferred to the Free Queue 630. Bothe the harvester and the reaper have an interface to de-reference SPRs back into SPs. The harvester does this for token output and the reaper will do this for state output. In many situations, SPRs will be used only within the live cache 570. Outside of the live cache 570, full SPs will be used.

Figure 7:
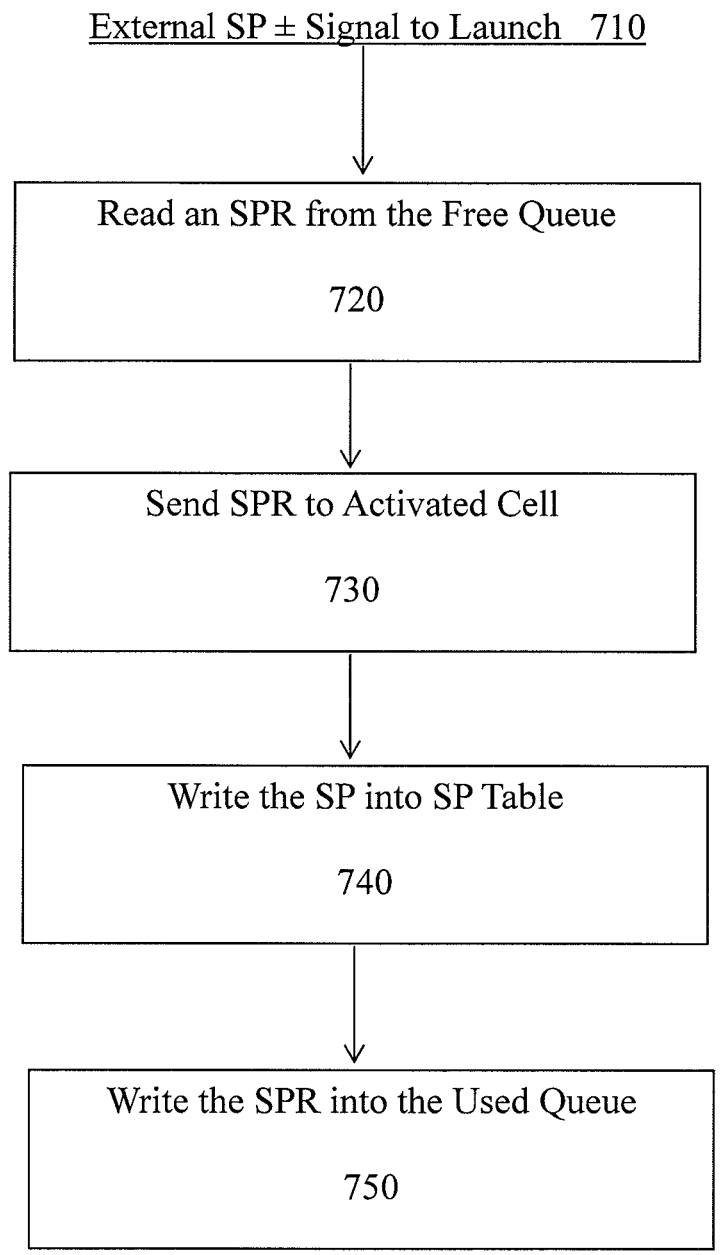
FIG. 7 is a flowchart of a method of allocating SPRs when an external WP is sent.

FIG. 7 is a flowchart for allocating SPRs when an external SP is sent. As discussed above, SP values are initiated in a cell array either when a start state begins matching, or when an external signal launches a non-start state while providing an SP. These are two instances where SPRs are allocated. When an external SP is sent with a signal to launch a non-start state 710, allocating an SPR is simply a matter of reading one from the Free Queue 720, sending this SPR to the activated cell 730 in place of the SP, writing the SP into the SP Table 740 at an address based on this SPR, and writing the SPR into the Used Queue 750. For start states, because any start cell may begin matching at any symbol position, the SP needed is the position of the current symbol. So, if multiple start states begin matching at the same position, they need the same SP so they can use the same SPR.

Figure 8:
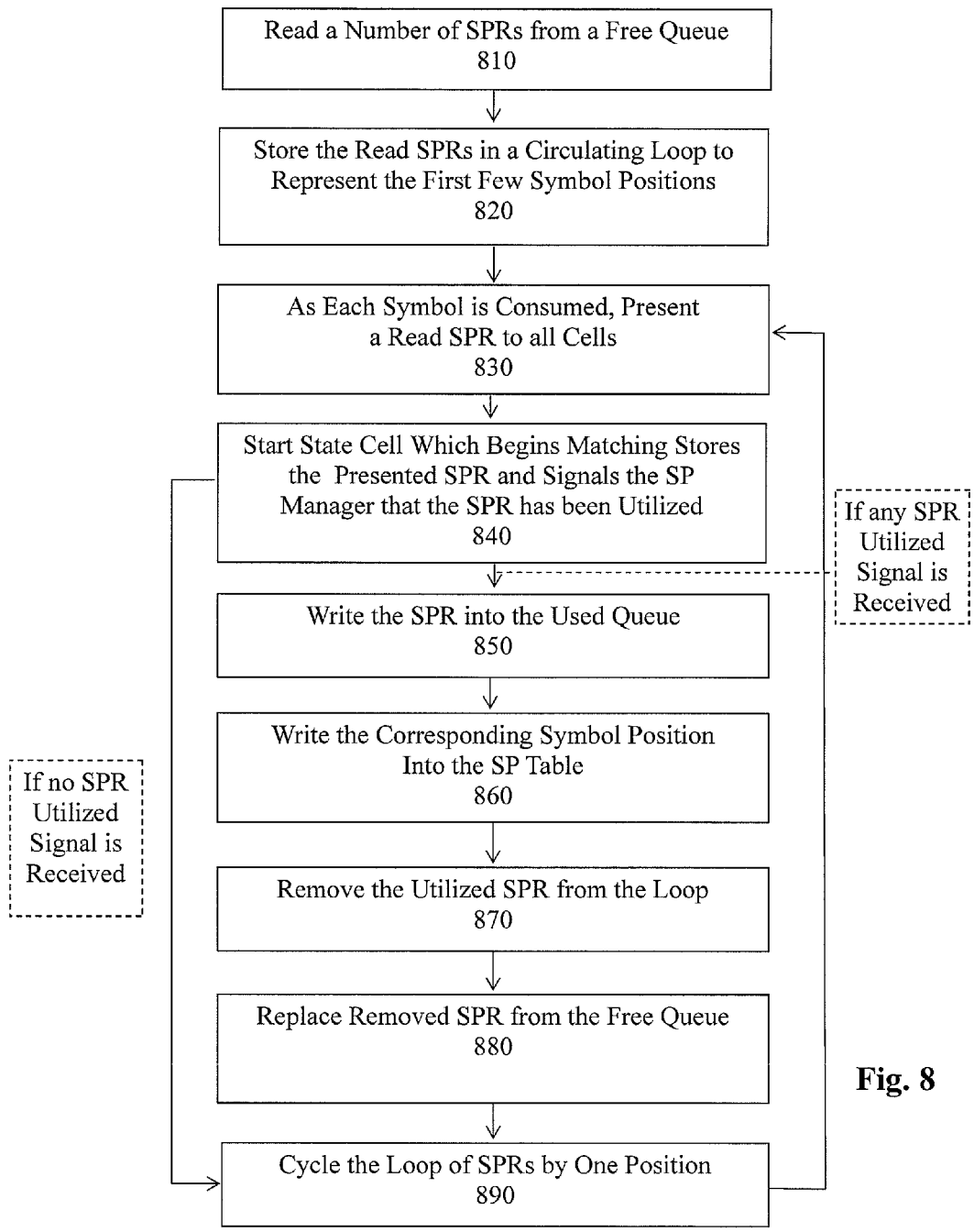
FIG. 8 is a flowchart of a method of allocating SPRs for start state conditions.

FIG. 8 is a flowchart for allocating SPRs for start state use. A method of allocating SPRs for start state use is as follows: A small number of SPRs, such as 3 for example, are read from the Free Queue 810 and stored in a circulating loop to represent the first few symbol positions 820. Referring back to FIG. 6, a circulating loop 650 ("SPR loop") is shown in the center of diagram. Referring now again to FIG. 8, As each symbol is consumed, one of these is presented to all active cells, as the SPR to store if matching begins 830. If any start state cell does begin matching, it stores the presented SPR and signals to the SP Manager that it utilized the presented SPR 840. If the SP Manager receives such a signal, it commits the allocation by writing this SPR into the Used Queue 850 and writes the corresponding symbol position into the SP Table 860 at the address corresponding to this SPR. Note that the SPR is written into the Used Queue only if any SPR is signaled as being utilized. If no SPR is signaled being utilized, then the flow will jump to block 890 where the SPRs will be cycle looped by one position. If the SP Manager receives an SPR utilized signal, it also removes this SPR from the loop 870, and replaces it with another SPR read from the Free Queue 880. If no start state cell begins matching, the SPR is left in the loop, where it can re-circulate to be presented again at a different symbol position, a number of symbols later equal to the length of the loop. The loop may be only a single SPR, but having a few such as 3 SPRs in the loop allows time to detect signals from start state cells that began matching and replace the allocated SPR if so.

SP de-referencing is optimized if an SP Table is used as described. Whenever an accepting state is active and needs to report a match, it outputs its appropriate stored SPR with the match information. This SPR is used as an address to read the SP Table and retrieve the associated SP. It is guaranteed that the appropriate SP is present, because the SPR could not be in use without having been allocated and the associated SP written to the table, and once allocated, the SPR is in the used Queue instead of the Free Queue. The same SPR value will not be allocated again, and the SP Table entry will not be overwritten. Similarly, if SP value(s) associated with an active cell are needed for another purpose, such as saving the cell's content in cross-packet context to resume matching later for the following symbol packet, the cell's stored SPR(s) can be de-referenced by reading the SP Table. Note that SPRs should not be de-allocated (transferred back to the Free Queue) when they are de-referenced, because there is not guarantee that no active cell continues to hold the same SPR.

A method of garbage collection according to an embodiment of the invention is as follows. Referring to FIG. 6, the garbage collection 615 function is shown schematically. The SP Manager reads an SPR from the Used Queue whenever it is not empty. It presents this SPR to each cell in the array for garbage collection search. Each cell compares the presented SPR value to its stored SPR associated with each active state in the cell, and signals back to the SP Manager if found. If allocated SPR values may be stored in other locations within the device than the NFA cells, then those locations should also participate in the garbage collection search. If the SP Manager receives a 'found' signal, it writes the SPR back into the Used Queue. If not, it knows the SPR has been abandoned and it writes it instead into the Free Queue—de-allocating it. The SP Table may be updated with a null SP value at the address of this SPR if useful for a specific application, but this is not necessary in all instances.

Such garbage collection is an advantageous method of SPR de-allocation for various reasons. Each SPR may move unpredictably through the cell array and may get duplicated via multiple transitions from the same state, so that the same SPR appears in many places. Active cells containing SPRs also frequently de-activate without notice. For these reasons, it is difficult for the SP Manager to directly know when a given SPR ceases to be in use in the cell array. But in common circumstances, many new SPs need to be tracked by the cell array over the lifetime of a symbol stream, so if abandoned SPRs are not somehow de-allocated, the Free Queue will run empty unless R is unreasonably large. Reference counting requires that SPR reference counts need to adjust every time a state is activated or deactivated in the cell array.

It is understood that to transfer SPs or SPRs to destination cells in accordance with an embodiment of the invention, there needs to be an implementation of a hardware NFA cell array. This array may be statically or dynamically configurable. The cell array may be capable of accepting a sequence of input symbols such as bytes or characters, activating NFA start states within the cells, signaling input symbols or related information to the cells, determining NFA state transitions for each symbol consumed, signaling state transitions between cells, tracking an active subset of NFA states, detecting and reporting matches in active accepting states, and outputting match information. According to the methods of this invention, the implementation can then be modified to initiate SP values in cells where matching begins, transmit them from cell to cell, and report SP values with match information from accepting states. The optional methods of substituting SP references for actual SP values may also be used, with an SP Manager constructed as described to allocate, de-reference, and garbage collect SP references. Match SP values can then be included in match information output from the cell array.

Having such an NFA cell array implementation, along with an NFA compiler appropriate to that implementation, a set of regular expressions or other rules to be matched, and one or more streams of input symbols to match those rules within, a user or application can then use this invention to determine matches to the rules including a start pointer of each match, or equivalently including the length of each match. The user or application must first use the NFA compiler to compile the rules into an NFA appropriate for configuring the cell array. Then the cell array may be statically configured with this NFA, or if the array is dynamically configurable, the NFA must be made available to the cell array in a form such as instructions in a memory readable by the array, that it can use to configure cells on demand. Then for each stream of symbols to be scanned, the symbols can be fed into the array in sequence. The array will report any match information including SP or length values, which the user or application must then receive.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of tracking a start pointer in active parallel cells in an NFA scanning system, said NFA scanning system comprising a plurality of start point references to a table containing representations of positions in the input stream, a Free Queue containing unallocated start point references, a Used Queue containing allocated start point references, a start point table, and a cell array, said method comprising:

establishing a start position value in an active start state cell where a match begins;

reading a start point reference from said Free Queue;

transmitting said read start point reference to a cell;

writing said position where a match began into said start point bable at an address based on said start point reference;

writing said start point reference into said Used Queue;

upon a state transition from an active cell to a destination cell, transmitting the start position value from said active cell to the destination cell and activating the destination cell; and reporting the start position value by an active cell completing the match.

2. The method of claim 1, said method further comprising:
resolving collisions by enabling destination NFA states to contain a plurality of start position values which result from two distinct active NFA states transitioning to the destination state, wherein the plurality of start position values comprise a list;
selecting at least one start position value from the list to transmit from the active cell to the destination cell; and
selecting at least one start position value from the list to report by the active cell completing the match.

3. The method of claim 1, wherein the step of reporting the start position value comprises de-referencing the start point reference by retrieving the position value stored in the start pointer table.

4. The method of claim 1, further comprising detecting that a particular start point reference is no longer in use by any active cell and enabling that particular start point reference to be available for a different cell.

5. The method of claim 1, further comprising:
reading the start point reference from the Used Queue;
detecting whether the start point reference is still in use by any active cell;
if the start point reference is in use, writing it back into the Used Queue; and
if the start point reference is not in use, writing it into the Free Queue for use in a different allocation.

6. The method of claim 5, wherein said step of detecting whether the start point reference is in use comprises broadcasting the start point reference to a plurality of cells wherein each active cell compares the start point reference with the start position values in said cell.

7. The method of claim 1, wherein if more than one start position value is transmitted to the same destination cell, selecting one of the transmitted start position values.

8. The method of claim 7, wherein the selection is based on a fixed prioritization of all possible transmitting cells at any given destination cell.

9. The method of claim 7, wherein the selected start position value is the smallest of the transmitted values.

10. The method of claim 1, further comprising, if more than one start position value is transmitted to the same destination cell, selecting one of the transmitted start position values.

11. The method of claim 1, further comprising:
receiving a start position value and an NFA state to activate from an external matching engine; and
activating said received NFA state within a cell with said received start position value.

12. The method of claim 11, further comprising:
reading a start point reference from a Free Queue;
sending the read start point reference to an activated cell in place of the start position;
writing the start position into a start position table at an address based on the start point reference; and
writing the start point reference into a Used Queue.

13. A method for allocating a start position reference for a start state in an array of cells, comprising:
reading at least one start position reference from a Free Queue and storing the read start position references in a circulating loop to represent first symbol positions;
presenting one of said read start position references to all cells as each symbol of an input stream is consumed;
if any start cell begins matching, storing the presented start position reference in that cell;
signaling an SP Manager that the cell that began matching utilized the presented start position reference;
writing, via the SP Manager, the presented start position reference into a Used Queue; and
writing a corresponding symbol position into an SP Table at the address corresponding to the presented start position reference.

14. A system for tracking a start pointer in active parallel cells in an NFA scanning system, said system comprising:
an SP manager, a loader, a harvester and a reaper;
a Free Queue;
a Used Queue; and
a plurality of NFA cells;
wherein start point references (SPRs) are allocated by the loader communicating with the SP manager and the SP manager records a start position into an SP table; SPRs are freed by the SP manager circulating start pointer references from the Used Queue through the plurality of NFA cells, the reaper and the harvester and transferring any SPR that is reported unused by the plurality of NFA cells, reaper and harvester to the Free Queue; and the SPRs are used within the NFA cells and transferred from one cell to another along with NFA state transitions.

15. The system of claim 14, wherein both the harvester and the reaper are enabled to de-reference the start pointer references into start positions by reading from the SP table.

* * * * *